United States Patent [19]

Mazzario

[11] Patent Number: 5,084,815
[45] Date of Patent: Jan. 28, 1992

[54] SORTING AND MERGING OF FILES IN A MULTIPROCESSOR

[75] Inventor: Andrea M. Mazzario, Naperville, Ill.

[73] Assignee: AT&T Bell Laboratories, Murray Hill, N.J.

[21] Appl. No.: 863,233

[22] Filed: May 14, 1986

[51] Int. Cl.$^5$ .......................... G06F 7/22; G06F 7/24; G06F 7/06
[52] U.S. Cl. ......................... 395/800; 364/248.1; 364/252; 364/260; 364/282.1; 364/283.1; 364/228.1; 364/230; 364/228; 364/228.3; 364/228.7; 364/230.3; 364/230.4; 364/236.2; 364/DIG. 1
[58] Field of Search ... 364/200 MS File, 900 MS File

[56] References Cited

U.S. PATENT DOCUMENTS

| | | | |
|---|---|---|---|
| 4,030,077 | 6/1977 | Florence et al. | 340/172.5 |
| 4,078,260 | 3/1978 | Chen et al. | 364/900 |
| 4,210,961 | 7/1980 | Whitlow et al. | 364/300 |
| 4,514,826 | 4/1985 | Iwata et al. | 364/900 |
| 4,567,572 | 1/1986 | Morris et al. | 364/900 |
| 4,583,194 | 4/1986 | Cage | 364/900 |

OTHER PUBLICATIONS

N. Takagi and C. K. Wong "A Hardware Sort-Merge System", IBM J. Res. Develop., vol. 29, No. 1, Jan. 1985, pp. 49-67.
S. Todd, "Algorithm and Hardware for a Merge Sort Using Multiple Processors", IBM J. Res. Develop., vol. 22, No. 5, (9/78), pp. 509-517.
S. Even, "Parallelism in Tape-Sorting", Comms. of the ACM, vol. 17, No. 4, (4/74), pp. 202-204.
C. D. Thompson et al., "Sorting on a Mesh-Connected Parallel Computer", Comms. of the ACM., vol. 20, No. 4, (4/77), pp. 263-271.

Primary Examiner—Thomas C. Lee
Assistant Examiner—Robert B. Harrell
Attorney, Agent, or Firm—David Volejnicek

[57] ABSTRACT

In a multiprocessor system (FIG. 1), file sorting and merging operations are broken down into a series of partial-file sorts and partial-file merges which are executed in parallel by a plurality of processors (21-26). In a file sorting operation, an input file processor (24) distributes segments (201) of an input file (200) from disk (34) to a plurality of sort processors (21-23) in a round-robin fashion. Each sort processor sorts records (203) of each received segment according to a key, and stores the sorted segments on disk (35) in a temporary file (220). A merge operation is then performed on the sorted segments, treating each segment as an input file. In a merge operation, a plurality of merge processors (21-23) each retrieve a different plurality of sorted segments block (202)-by-block from the temporary file, merge the records of the retrieved segments, and supply records of the merged segments to an output file processor (26). The output file processor merges the records received from the plurality of merge processors and stores them in an output file (230) on disk (36).

18 Claims, 9 Drawing Sheets

FIG. 9
MERGE PROCESS

SORTING AND MERGING OF FILES IN A MULTIPROCESSOR

TECHNICAL FIELD

The invention relates to a method of and apparatus for efficiently sorting and merging files using a multiprocessor computer.

BACKGROUND OF THE INVENTION

Multiprocessor computing systems, comprising a collection of microprocessors operating simultaneously and cooperating with each other in the performance of system tasks, are cost effective in terms of the processing power they deliver in relation to their cost. Multiprocessor systems are therefore beginning to replace mainframe computers in many applications, including on-line transaction processing applications. However, multiprocessor systems are typically slow, in comparison with mainframe computers, in performing some of the ancillary batch operations that usually accompany and complement transaction processing functions.

A significant percentage of the batch operations that support transaction processing comprises the sorting and merging of files. Sorting and merging of files, particularly large files, is a central processing unit-intensive and input and output-intensive task whose execution has typically been significantly faster on a mainframe computer than on a multiprocessor system. Consequently, file sorting and merging speed is often a significant obstacle to replacement of mainframe computers with multiprocessor systems in on-line transaction processing applications. What the art requires, therefore, is an efficient implementation of a file sorting and merging mechanism in a multiprocessor system.

SUMMARY OF THE INVENTION

The invention is directed to solving these and other disadvantages of the prior art. According to the invention, a multiprocessor merging apparatus efficiently retrieves stored files from secondary memory, merges retrieved files in a parallel manner into an output file, and stores the output file back in secondary memory. A multiprocessor apparatus for merging a plurality of sorted files includes a plurality of processors each for merging files transferred thereto into a merged file. Files, including the plurality of sorted files, are stored in secondary memory of the apparatus. An arrangement of the apparatus transfers from the secondary memory to each processor of the plurality a different plurality of the sorted files. The processors merge the received files, and an arrangement of the apparatus transfers the merged files from the plurality of processors to one processor of the apparatus. The one processor merges the merged files transferred thereto into an output file. An arrangement of the apparatus stores the output file in the secondary memory.

Accordingly, a method of merging a plurality of sorted files stored in a secondary memory in a multiprocessor system comprises the steps of transferring from the secondary memory to each processor of a plurality of processors a different plurality of the sorted files, merging received files into a merged file at each of the plurality of processors, transferring the merged files from the plurality of processors to a processor, merging received merged files into an output file at the processor, and storing the output file in a secondary memory.

A multiprocessor file sorting apparatus according to this invention includes the merging apparatus. It efficiently retrieves portions—called segments—of an input file from secondary memory, sorts retrieved portions in a parallel manner, merges sorted portions in a parallel manner into an output file, and stores the output file back in secondary memory. A multiprocessor apparatus for sorting an input file includes a first plurality of processors each for sorting each input file portion transferred thereto. Files, including the input file, are stored in secondary memory of the apparatus. An arrangement of the apparatus transfers from secondary memory to each processor of the first plurality a different at least one portion of the input file. The processors sort the received portions, and an arrangement of the apparatus stores each sorted portion in secondary memory. The apparatus also includes a second plurality of processors—which illustratively are the same processors as the first plurality—each for merging sorted portions transferred thereto into a merged portion. An arrangement of the apparatus transfers from the secondary memory to each processor of the second plurality a different plurality of the sorted portions. The processors merge the received portions, and an arrangement of the apparatus transfers the merged portions from the second plurality of processors to one processor of the apparatus. The one processor merges the merged portions transferred thereto into an output file. An arrangement of the apparatus stores the output file in the secondary memory.

Accordingly, a method of sorting an input file stored in a secondary memory in a multiprocessor system comprises the steps of transferring from the secondary memory to each processor of a first plurality of processors a different at least one portion of the input file, sorting each received input file portion at each processor of the first plurality, storing each sorted portion in secondary memory, transferring from the secondary memory to each processor of a second plurality of processors a different plurality of sorted portions, merging received portions into a merged portion at each processor of the second plurality, transferring the merged portions from the second plurality to one processor, merging received merged portions into an output file at the one processor, and storing the output file in secondary memory.

The method and apparatus reduce the time required to perform a merge or a sort operation by organizing the individual processors of a multiprocessor system into processing pipelines and by reducing to a minimum the transfer operations to and from secondary memory involved in performing the merge or sort operation. The transfers are optimized to take full advantage of the parallel processing capability of a multiprocessor system. The parallelism exploits the capability of processors that have already received a segment for sorting to commence sorting while segments are still being transferred for sorting to other processors. It further exploits the capability of certain processors to be merging blocks of records transferred thereto while further such blocks of records are being created—merged—by other processors. Many activities are executed in parallel, so the time required to perform a merge or sort operation is reduced. The performance of a multiprocessor system in performing sort and merge operations is thereby significantly enhanced. Yet the invention requires no special-purpose sorting or merging hardware; both the sorting and the merging operations may be done by general-purpose processors. The parallel utilization of a plurality of processors eliminates the "CPU bottleneck" in performing sort and merge operations, and reduces the amount of secondary memory (illustratively disk) input and output activity required to perform the operations.

Illustratively, the arrangement for storing each sorted portion comprises a processor for merging into a large sorted portion a plurality of sorted portions each received from a different processor, an arrangement for transferring each sorted portion from a plurality of processors to the one processor, and an arrangement for storing each large sorted portion in secondary memory. The arrangement for transferring a different plurality of sorted portions then comprises an arrangement for transferring from secondary memory to each processor of the second plurality a different plurality of large sorted portions.

Accordingly, in the sorting method, the step of storing each sorted portion comprises the steps of transferring each sorted portion from a plurality of processors to one processor, merging at the one processor into a large sorted portion a plurality of sorted portions each received from a different processor, and storing each large sorted portion in a secondary memory. The step of transferring a different plurality of sorted portions then comprises the step of transferring from the secondary memory to each processor of a second plurality of processors a different plurality of large sorted portions.

This illustrative modification of the first-described method and apparatus reduces the amount of processing required to merge the plurality of sorted input file portions, by performing some, but not all, merging of the portions as part of the process of storing the sorted portions in secondary memory. It thus further improves the performance of the multiprocessor system in performing a sort operation.

These and other advantages of the present invention will become apparent from the following description of an illustrative embodiment of the invention taken together with the drawing.

DETAILED DESCRIPTION

Figure 1:
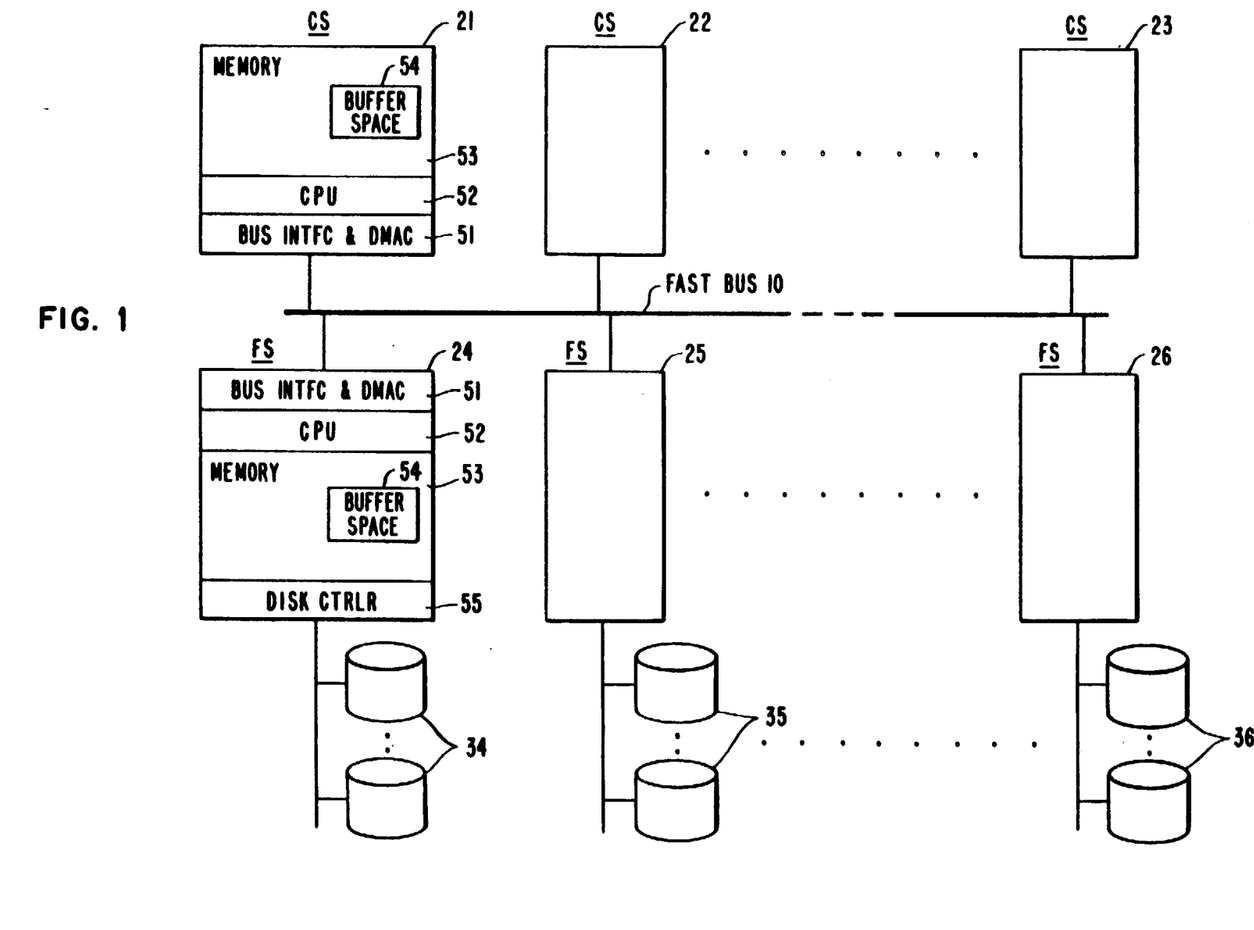
FIG. 1 is a block diagram of a multiprocessor computing system that includes illustrative embodiments of the invention.

FIG. 1 shows an illustrative multiprocessor computing system. It includes a plurality of processors 21-26 each connected to a fast communication bus 10. Each processor 21-26 is, illustratively, any general purpose microprocessor, for example, one comprising the WE® 32100 family of microprocessors of AT&T and memory. Bus 10 is, for example, the S/NET, illustratively described in an article by S. R. Ahuja entitled "S/NET: A High-Speed Interconnect for Multiple Computers", in *IEEE Journal on Selected Areas of Communications*, Vol. SAC-1. No. 5 (November 1983), and in U.S. Pat. No. 4,384,323 to Ahuja. The system illustratively runs a version of the UNIX® operating system of AT&T.

Processors 21-26 include two kinds of processors: CPU servers (CS) 21-23, which have on-board memory but no peripherals; and file servers (FS) 24-26, which have both on-board memory and access to system secondary memory, illustratively disk memories 34-36. Each processor 21-26 includes an on-board main memory 53, a central processing unit (CPU) 52, and a bus interface and direct memory access controller (DMAC) circuit 51. Circuit 51 allows any processor 21-26 to directly access memory 53 of any other processor 21-26 over bus 10, without involvement in the access of CPUs 52 of the accessing and the accessed processor. Additionally, each file server 24-26 includes a disk controller 55 for access to associated disk memory 34-36, respectively.

Aside from their use for bulk storage unrelated to this invention, disk memories 34-36 are used to store data files. A file is a sequential collection of data items referred to as records. Operations commonly performed on files include sort and merge. A sort involves the sequential ordering of records in a file according to some criterion, referred to as a key. A merge involves the combining of records in a plurality of sorted files into a single, large, sorted file.

A master program, whose execution includes sorting or merging of files is loaded into the system of FIG. 1 and executes therein in a conventional manner. As part of system initialization for execution of the program, various processors 21-26 are supplied with portions of the program that they will execute. A configuration table (not shown) for the master program indicates in a conventional manner which processors 21-26 are to be loaded with which program portions. These program portions implement processes flowcharted in FIGS. 5-10. Also, buffer space 54 is allocated in memories 53 of processors 21-26 for use by that program. For purposes of sorting or merging files, the configuration table specifies the location of an input file or files, which are the files to be sorted or merged, and the location of an output file, which is the file in which the results of the sort or merge operation are to be stored. An input file and an output file may be the same file. The configuration table also specifies the location of a temporary file or files, which serve to buffer intermediate results during execution of the sort or merge operations. The input, output, and temporary file locations are in secondary memory, i.e., disk memory 34-36.

Performance of a file sort in the system of FIG. 1 also involves the performance of a file merge. Therefore, an explanation of the sort operation alone will serve to explain both the sort and merge operations.

Two embodiments of the invention are illustrated in the drawing. The first and simpler one is illustrated in FIGS. 1-2, 4-6, and 9-10. The second one is illustrated in FIGS. 1, 3-5, and 7-10.

Figure 2:
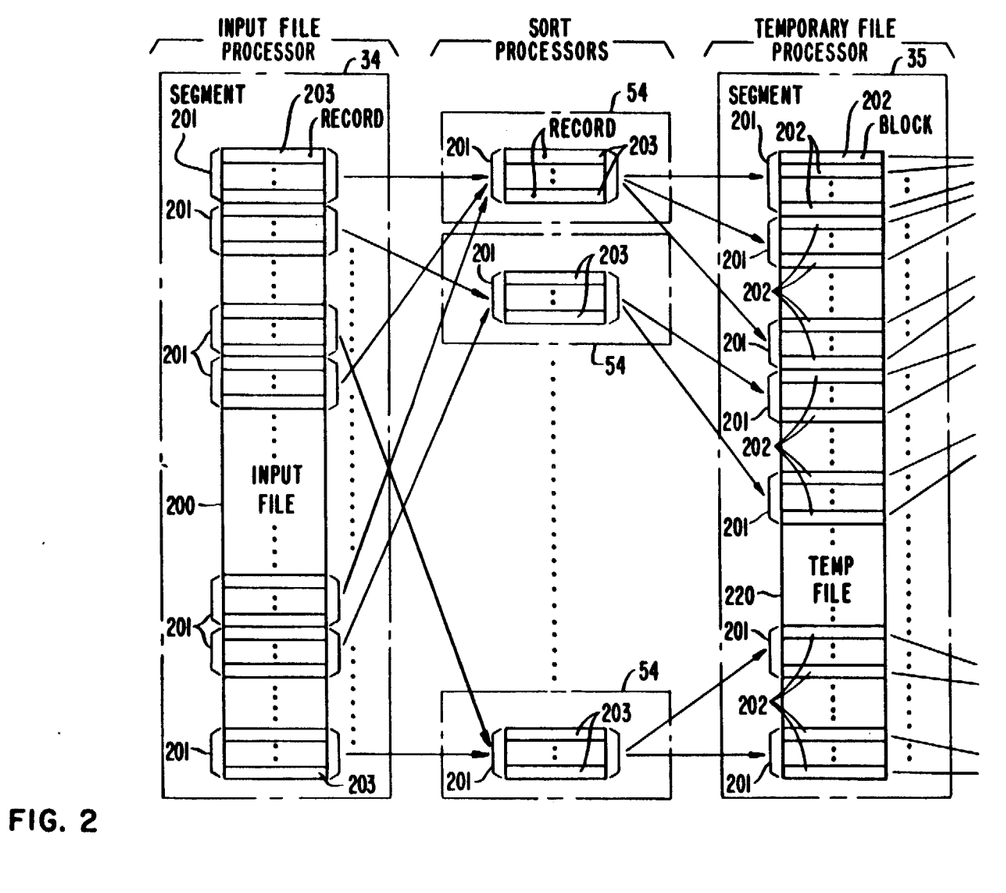
FIG. 2 is a graphic representation of the layout of, and transfers that occur between, portions of memories of the system of FIG. 1 involved in a sort portion of a first embodiment of the invention.
Figure 4:
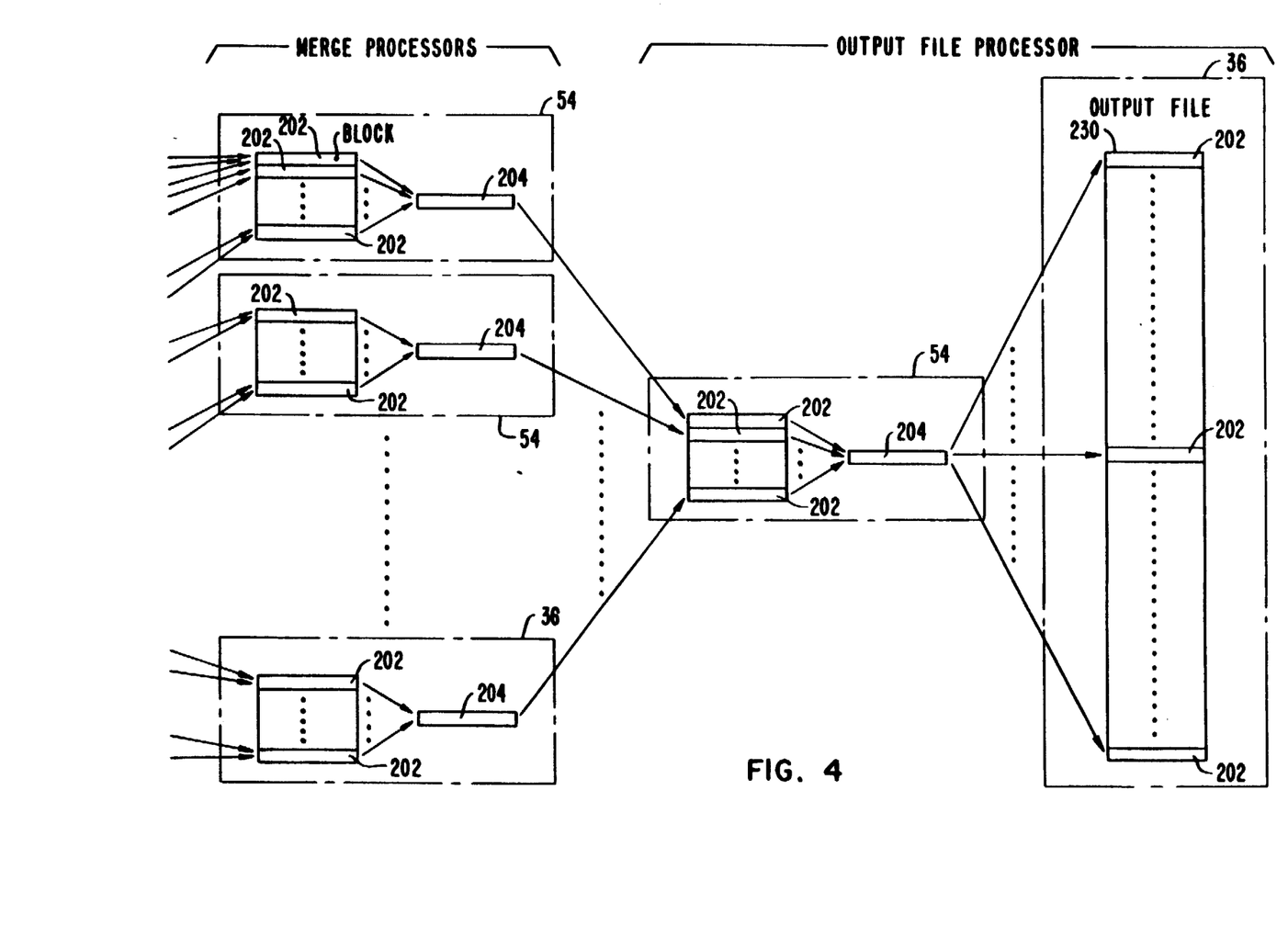
FIG. 4 is a graphic representation of the layout of, and transfers that occur between, portions of memories of the system of FIG. 1 involved in a merge portion of the invention.

Commencing with a description of the simpler embodiment, FIGS. 2 and 4 graphically show the layout of, and transfers that occur between, memory portions involved in the sort operation. Turning to FIG. 2, an input file 200 that is to be sorted is illustratively located in disk memory 34. Input file 200 comprises a sequence of a plurality of records 203. Input file 200 may be thought of as being logically subdivided into a plurality of contiguous non-overlapping segments 201. A segment 201 is merely any portion of input file 200 comprising a plurality of records 203. Segments 201 need not be, but generally are, all of the same size. Each segment 201 may be thought of as a separate file.

Figure 5:
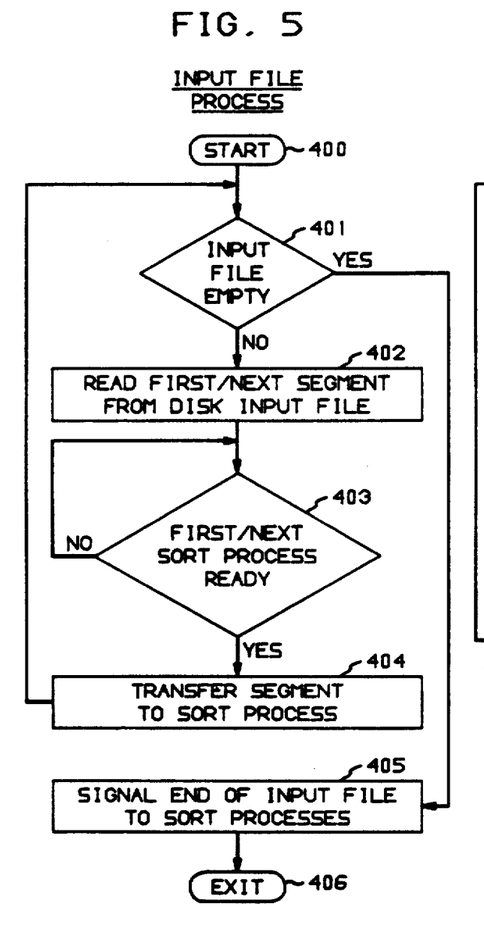
FIG. 5 is a flowchart of an input file process of the invention.

FIG. 5 flowcharts the input file process, executed by an input file processor—illustratively the processor 24—whose attached disk 34 stores input file 200 that is to be sorted. Processor 24 enters the process, at block 400, and checks whether all records 203 have been read from input file 200 so that file 200 is empty, at block 401. Since execution of the process is just starting and no records 203 have been read from file 200, processor 24 finds file 200 not to be empty at block 401. Processor 24 therefore reads the first segment 201 from file 200, at block 402, using its disk controller 55 to retrieve the segment 201 from disk 34.

A plurality of processors 21-26 will be involved Illustratively, CPU servers 21-23 will act as the sorting processors. Processor 24 checks, at block 403, whether it has received a signal from a sort process executing on a first one of the plurality of sorting processors 21-23 indicating that that processor is ready to receive a segment 201. When it has received the signal at block 403, processor 24 uses its bus interface and DMAC circuit 51 to transfer read segment 201 to buffer space 54 of the first of sorting processors 21-23, at block 404. This is illustrated in FIG. 2, by an arrow leading from a segment 201 of input file 200 to a segment 201 in a buffer space 54.

Upon receipt of a segment 201, a sort process executing on a sorting processor immediately sorts received segment 201, stores sorted segment 201, and indicates its readiness to receive and sort a next segment 201, as will be explained in more detail on conjunction with FIGS. 6 and 7.

Meanwhile, processor 24 returns from block 404 to block 401, reads out next segment 201 from file 200, at block 402, checks whether a sort process on the next one of the sorting processors 21-23 is ready to receive a segment 201, at block 403, and transfers segment 201 to that sorting processor 21-23, at block 404.

Processor 24 repeats the loop of blocks 401-404 for each segment 201. Generally, there are more segments 201 than sorting processors 21-23. Eventually, therefore, processor 24 will have transferred a segment 201 to each sorting processor 21-23. At this point, processor 24 checks again whether the sort process on the first one of sorting processors 21-23 is ready to receive another segment 201, and so on.

Processor 24 continues to distribute segments 201 to sorting processors 21-23 in a round-robin fashion until all segments 201 have been distributed. This is illustrated in FIG. 2, by arrows connecting sequential segments 201 of input file 200 to segments 201 of sequential buffer spaces 54, and by arrows connecting a plurality of different non-sequential segments 201 of input file 200 to each segment 201 in a buffer space 54.

When all segments 201 have been distributed, processor 24 finds, at block 401, that input file 200 is empty. Processor 24 then signals sorting processes on all sorting processors 21-23 to notify them of the end of input file 200, at block 405. The process of FIG. 5 is thus completed, and processor 24 exits the process, at block 406.

Figure 6:
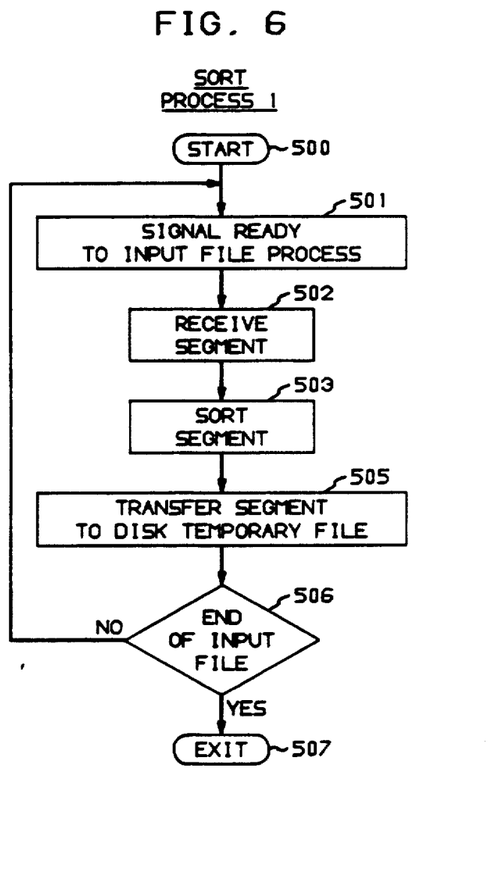
FIG. 6 is a flowchart of a sort process of the first embodiment of the invention.

Turning to FIG. 6, it flowcharts the sort process that is executed by each one of the sorting processors 21-23 involved in sorting input file 200. A processor—illustratively processor 21—enters the sort process, at block 500, and sends a signal to the input file process of processor 24 to inform it that it is ready to receive a segment 201, at block 501. Upon receipt of segment 201 in its buffer space 54, at block 502, CPU 52 of processor 21 sorts received segment 201, at block 503, by arranging records 203 included in received segment 201 in sequential order according to whatever key was provided thereto at initialization. Segment 201 is sorted in a conventional manner. Numerous sorting algorithms are known to the art. Any suitable algorithm may be used.

After received segment 201 has been sorted, at block 503, processor 21 transfers sorted segment 201 to a disk temporary file 220 (see FIG. 2), at block 505. Since processor 21 is not a file server and, therefore does not have a disk associated therewith, processor 21 uses its circuit 51 to transfer sorted segment 201 by DMA transfer to disk 35 of processor 25. Circuit 51 of processor 21 is assisted in this operation by the operating system of processor 25. This operation is illustrated in FIG. 2, by arrows connecting segments 201 in buffer space 54 to segments 201 of temporary file 220 on disk 35. Alternatively, disks of a plurality of processors may be used to store temporary file 220, with each disk storing a portion of the temporary file.

Following transfer of sorted segment 201 to temporary file 220, processor 21 checks whether it has received the end of input file signal from the input file process of processor 24, at block 506. If not, processor 21 returns to block 501 to receive, sort, and store in temporary file 220 another segment 201. This is illustrated in FIG. 2 by a plurality of arrows connecting segment 201 in each buffer space 54 to a plurality of segments 201 of temporary file 220. If processor 21 has received the end of input file signal, its task is completed and it exits the process of FIG. 6, at block 507.

From this point on, the file sort and the file merge operations become the same. A file merge involves the combining of records of a plurality of files into a single sorted file, in sequence according to the sort key. For purposes of the merge operation, each sorted segment 201 stored in temporary file 220 is a separate file. To merge records 203 of a plurality of segments 201, a processor CPU 52 compares with each other the "first" record 203 in the sequence of records 203 of each of the plurality of segments 201, chooses the one record 203 which is "first" according to the sort key, transfers the chosen record 203 into a buffer 204 in buffer space 54, and stores it there in sequential order with any other records 203 that may have been chosen previously. The merging processor's CPU repeats this activity until all records of the plurality of all segments 201 have been so combined.

Typically, buffer space 54 of a processor 21-26 is not large enough to hold simultaneously all segments 201 being merged. Therefore, a processor logically subdivides each segment 201 into a plurality of blocks 202 each comprising a plurality of sequential records 203, and merges the plurality of segments 201 a block 202 from each segment at a time. This is illustrated in FIGS. 2 and 4, by arrows connecting all blocks 202 of each one of a plurality of segments 201 of temporary file 220 to a different block 202 of a buffer space 54, and further by arrows connecting all blocks 202 of a buffer space 54 with an output buffer 204 of that buffer space 54.

A plurality of processors will be involved in merging together sorted segments 201. Illustratively, the same processors 21-23 that sorted segments 201 will now act as merge processors. The merge process executed by each one of the merge processors 21-23 is flowcharted in FIG. 9.

Figure 9:
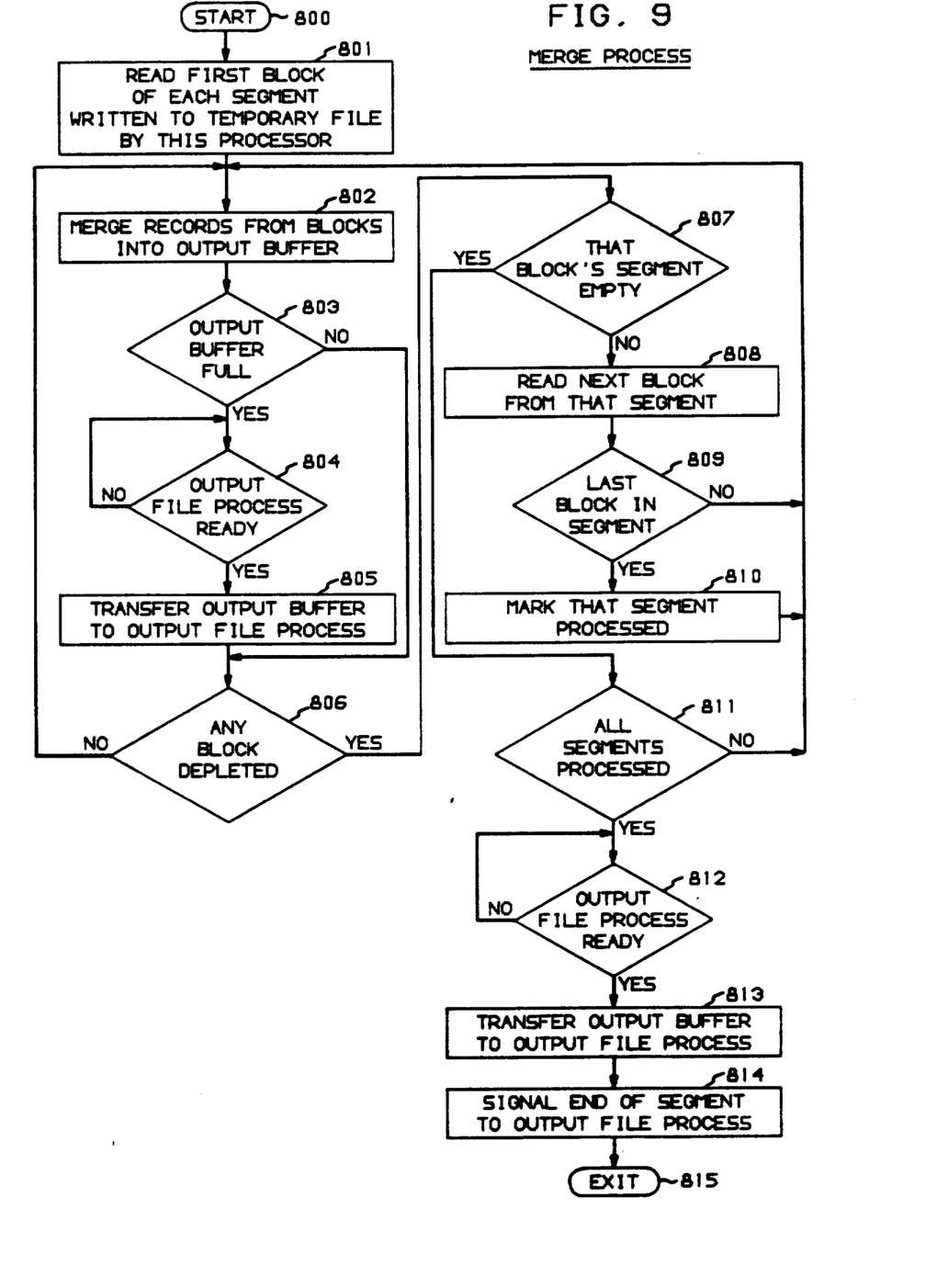
FIG. 9 is a flowchart of a merge process of the invention.

Turning to FIG. 9, a merge processor—illustratively again processor 21—enters the merge process, at block 800, and proceeds to read out a block 202 of each segment 201 that it sorted and stored in temporary file 220, at block 801, using its circuit 51 to do so. Processor 21 stores each read block 202 in its buffer space 54. CPU 52 of processor 21 then merges records 203 from blocks 202 in buffer space 54 into output buffer 204, also in buffer space 54, at block 802. Illustratively, output buffer 204 has storage capacity to hold a block 202 of records 203.

Processor 21 is not restricted to merging segments 201 that it sorted. It could merge any plurality of segments 201. However, from a practical standpoint, it is easier to have a processor merge segments 201 that it sorted, as it already has needed information about them, such as their length and their location in temporary file 220.

Periodically, for example each time after it has transferred a record 203 from a block 202 to its output buffer 204, processor 21 checks whether output buffer 204 is full of records 203, at block 803. If so, processor 21 checks at block 804 whether it has received from an output file process of a processor responsible for the output file 230 (see FIG. 4) a signal indicating that the output file process is ready to receive another output buffer 204 full of records 203. When it has received such a signal, processor 21 transfers the contents of its output buffer 204 to the output file processor, at block 805, using its circuit 51 to do so.

If output buffer 204 is not found to be full at block 803, or after buffer 204 has been emptied at block 805, processor 21 checks at block 806 whether any block 202 stored in its buffer space 54 has been depleted of records 203, i.e., whether all records 203 of that block 202 have been transferred to output buffer 204.

If a block 202 has been depleted, processor 21 checks at block 807 whether it has already read out the last block 202 from segment 201 that included that depleted block 202, so that that segment 201 is empty. If not, processor 21 uses its circuit 51 to read the next block 202 from that segment 201 into its buffer space 54, at block 808. Processor 21 also checks at block 809 whether this block 202 is the last block 202 of that segment 201. If so, processor 21 marks this segment 201 as processed, at block 810, for use next time it performs the test at block 807. The marking of a segment 201 as processed may, for example, involve simply storing internally to processor 21 an indication that the segment has been emptied.

If at block 807 processor 21 finds a segment 201 to have been marked empty, it checks, at block 811, if all segments 201 that it is merging have been processed, i.e., whether all segments 201 that it is merging are marked processed and all blocks 202 in buffer space 54 are depleted.

Processor 21 repeats the steps of blocks 807-811 for every block 202 of its buffer space 54 that it finds depleted at block 806.

From blocks 809-811, processor 21 returns to block 802 to merge more records 203, unless it finds all segments 201 to have been processed at block 811.

If at block 811 processor 21 finds all segments 201 to have been processed, it checks, at block 812, whether the output file process is ready to receive another buffer 204 full of records 203. When the output file process is ready, processor 21 transfers contents of output buffer 204 to the output file processor, at block 813, using its circuit 51 to do so. Processor 21 then sends an "end of segment" signal to the output file process, at block 814, to notify the output file process that it has completed its task and will send no more records 203 thereto. Processor 21 then exits the process of FIG. 9 at block 815.

Figure 10:
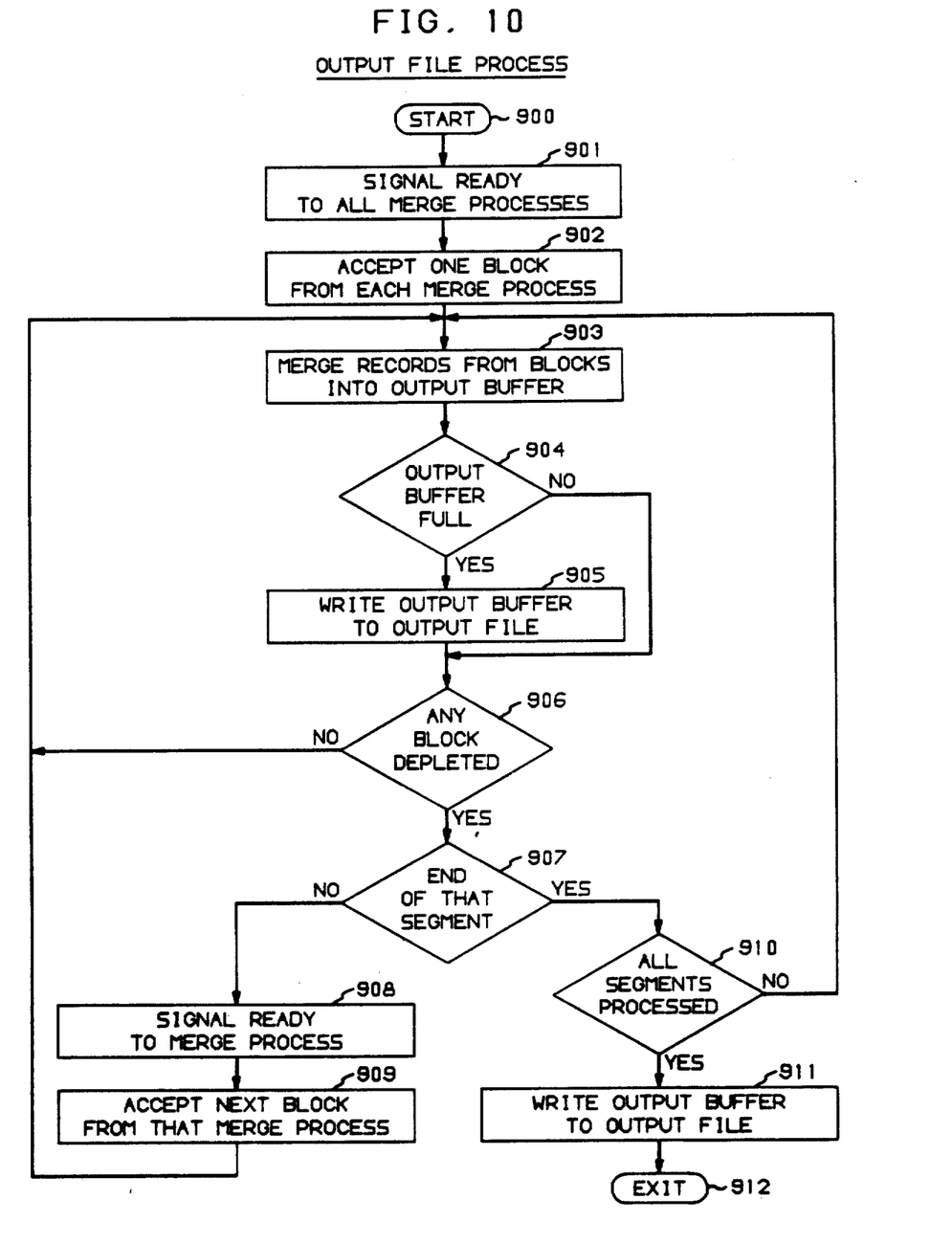
FIG. 10 is a flowchart of an output file process of the invention.
Figure 11:
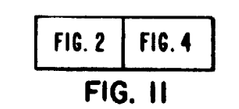
FIG. 11 shows the relationship of FIGS. 2 and 4 in forming a complete diagram.
Figure 12:
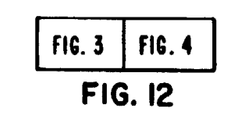
FIG. 12 shows the relationship of FIGS. 3 and 4 in forming a complete diagram.

FIG. 10 flowcharts the output file process executed by whatever file server 24-26 stores output file 230 on its associated disk. The output file process completes the merge of segments 201 by merging into a single output file 230 records 203 received from the plurality of merge processors 21-23. Assuming that the output file 230 is stored on disk 36, as shown in FIG. 4, processor 26 acts as the output file processor.

Processor 26 enters the process of FIG. 10 at block 900, and sends a signal to the merge process of each one of merge processors 21-23 to inform them that it is ready to receive input from them, at block 901. Upon receiving a block 202 of records 203 from output buffer 204 of each one of the merge processors 21-23, at block 902, CPU 52 of processor 26 proceeds to merge records 203 from the received blocks 202 into output buffer 204 of processor 26, at block 903. CPU 52 of processor 26 merges the records in the manner described for a merge processor 21 in conjunction with block 802. Also similarly to merge processor 21, processor 26 periodically checks whether its output buffer 204 is full, at block 904. If so, processor 26 writes the contents of its output buffer 204 to space on disk 36 reserved for output file 230, at block 905, using its disk controller 55 to do so. Successive contents of output buffer 204 are written sequentially in output file 230 on disk 36. All this is illustrated in FIG. 4, which shows arrows connecting output buffers 204 of the merge processors to blocks 202 of buffer space 54 of the output file processor, shows arrows connecting blocks 202 of buffer space 54 of the output file processor to its output buffer 204, and shows arrows connecting this output buffer 204 to the whole of output file 230 on disk 36.

Having emptied its buffer 204 into output file 230, at block 905, or not having found its buffer 204 to be full, at block 904, processor 26 checks if any block 202 in its buffer space 54 is depleted, at block 906. If not, processor 26 returns to block 903 to merge more records.

If a block 202 is found to be depleted at block 906, processor 26 checks at block 907 whether it has received an "end of segment" signal from the merge process of the one of merge processors 21-23 that supplied that block 202. If not, processor 26 signals, at block 908, to the merge process of that one of merge processors 21-23 that is is ready to receive another block 202. Processor 26 receives the other block 202 from that merge processor at block 909.

If at block 907 processor 26 finds that it has received an "end of segment" signal from the merge process, it checks at block 910 whether all segments have been processed, i.e., if it has received the "end of segment" signal from merge processes of all merge processors 21-23 and if all blocks 202 in its buffer space 54 are depleted.

Processor 26 repeats the steps of blocks 907-910 for every block 202 in its buffer space 54 that it finds depleted at block 906.

From blocks 909 and 910, processor 26 returns to block 903 to merge more records 203, unless it finds at block 910 all segments to have been processed.

If at block 910 processor 26 finds all segments to have been processed, it uses its disk controller 55 to transfer contents of its output buffer 204 to the output file 230, at block 911. All records 203 of original input file 200 have now been written to output file 230 on disk 36, and processor 26 exits the process of FIG. 10 at block 912. The sort of the input file 200 is completed, as is the merge of sorted segments 201 from temporary file 220.

An alternative embodiment of the invention speeds up merging of segments 201 by engaging the temporary file processor to merge certain sorted segments 201 being written to temporary file 220, prior to writing them in file 220. Preferably, a plurality of temporary file processors are used, each to merge certain segments 201 from a different group of sorting processors.

Figure 3:
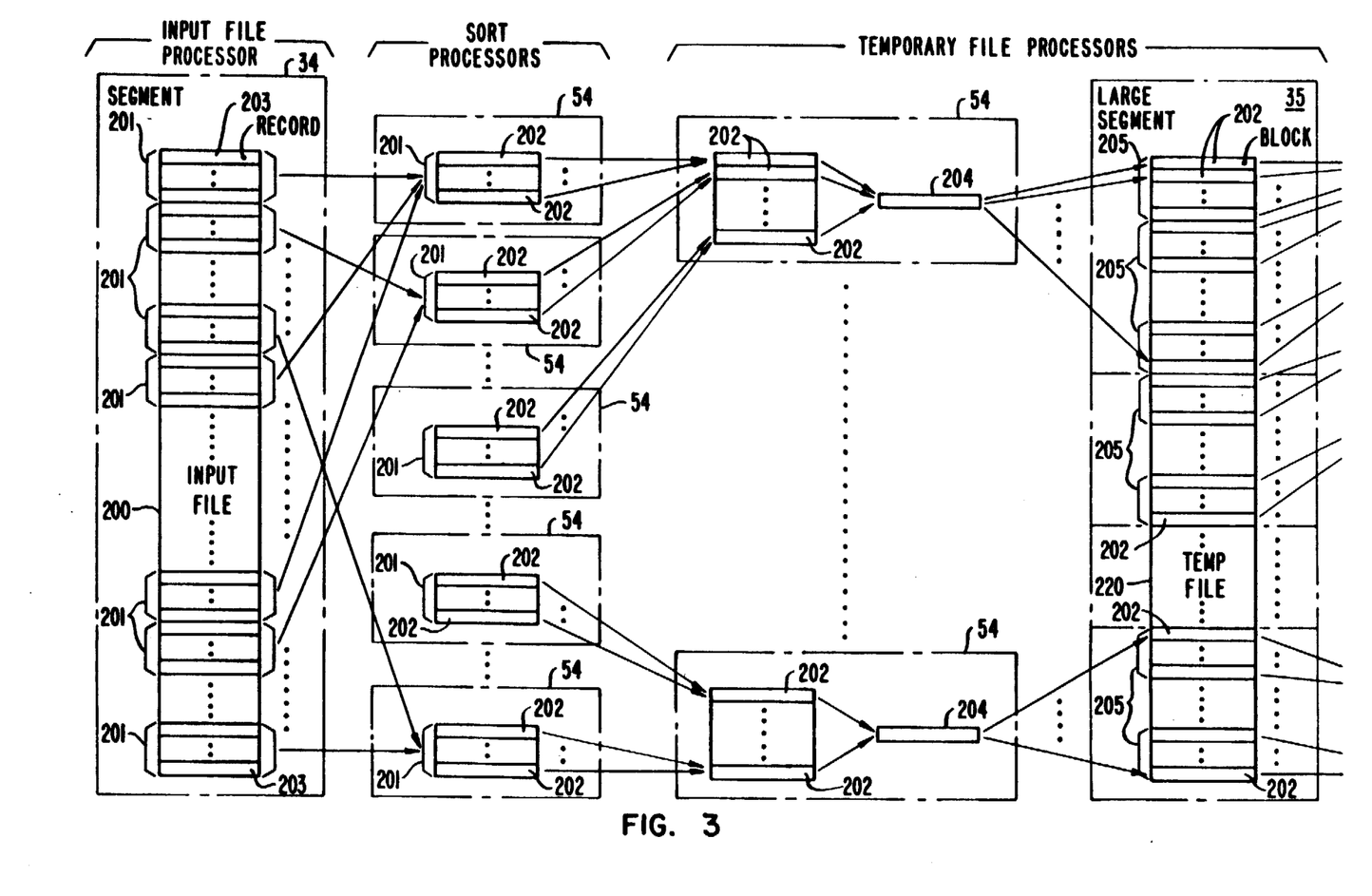
FIG. 3 is a graphic representation of the layout of, and transfers that occur between, portions of memories of the system of FIG. 1 involved in a sort and temporary file merge portions of a second embodiment of the invention.

FIGS. 3 and 4 graphically show the layout of, and transfers that occur between, memory portions involved in the sort operation. As can be seen from a comparison of FIGS. 2 and 3, the only difference between this and the first-described embodiment is in the transfer of records 203 between sort processors and the temporary file processor, and the manner in which those records 203 are handled at the temporary file processor.

The input file process is the same as for the first embodiment and illustrated in FIG. 5.

Figure 7:
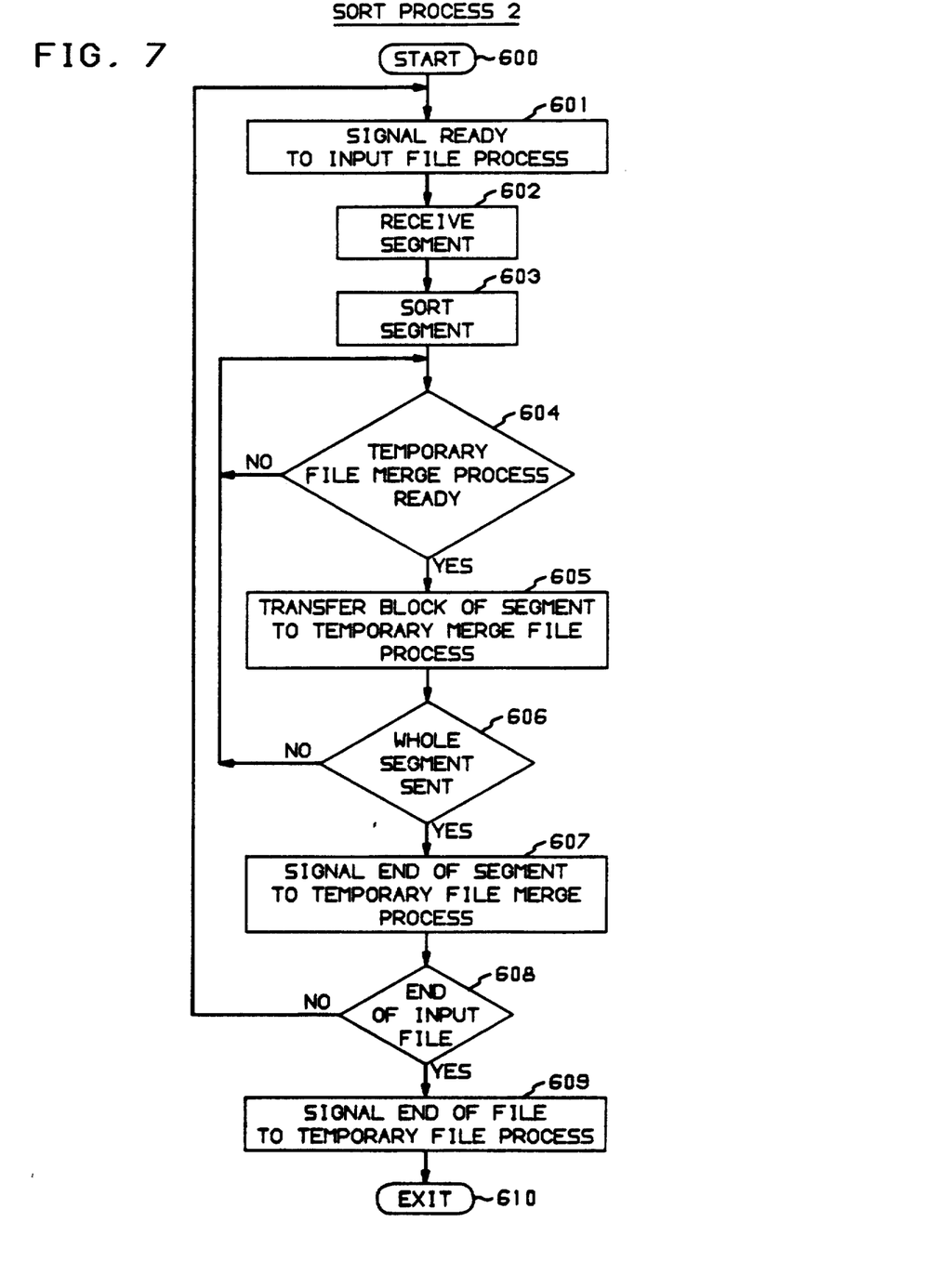
FIG. 7 is a flowchart of a sort process of the second embodiment of the invention.

FIG. 7 flowcharts the sort process that is executed by each one of the sorting processors 21-23. Again illustratively considering processor 21, the activities that it performs at blocks 600-603 are identical to those at blocks 500-503 of FIG. 6.

Its CPU 52 having sorted a received segment 201 at block 603, processor 21 checks at block 604 whether it has received a signal from temporary file process of processor 25 informing it that it is ready to receive input from processor 21. When the temporary file process of processor 25 is ready, processor 21 transfers to processor 25 the first block 202 in the sequence of blocks 202 making up sorted segment 201, at block 605, using its circuit 51 to do so.

Alternatively, processor 21 may place sorted records 203 into an output buffer (not shown) in its buffer space 54 and transfer the buffer contents to temporary file processor 25 when the output buffer contains a sorted block 202 of records 203. In this manner, processor 21 may commence transfers to temporary file processor 25 while it is still sorting received segment 201.

Having sent a block 202 to temporary file processor 25, at block 605, processor 21 checks at block 606 whether this was the last block 202 of a segment 201, i.e., whether a whole segment 201 has been sent. If not, processor 21 returns to block 604 to send another block 202 to processor 25. If the whole segment 201 has been sent, processor 21 sends an "end of segment" signal to temporary file merge process of processor 25, at block 607. Processor 21 then checks whether it has received an "end of input file" signal from input file process of processor 24. If not, processor 21 returns to block 601 to receive, sort, and transfer yet another segment 201.

If processor 21 determines that it has received the "end of input file" signal from input file process of processor 24, its sorting tasks are completed. It therefore sends an "end of file" signal to temporary file merge process of processor 25, at block 609, to appraise it of this fact. Processor 21 then exits the sort process of FIG. 7 at block 610.

Figure 8:
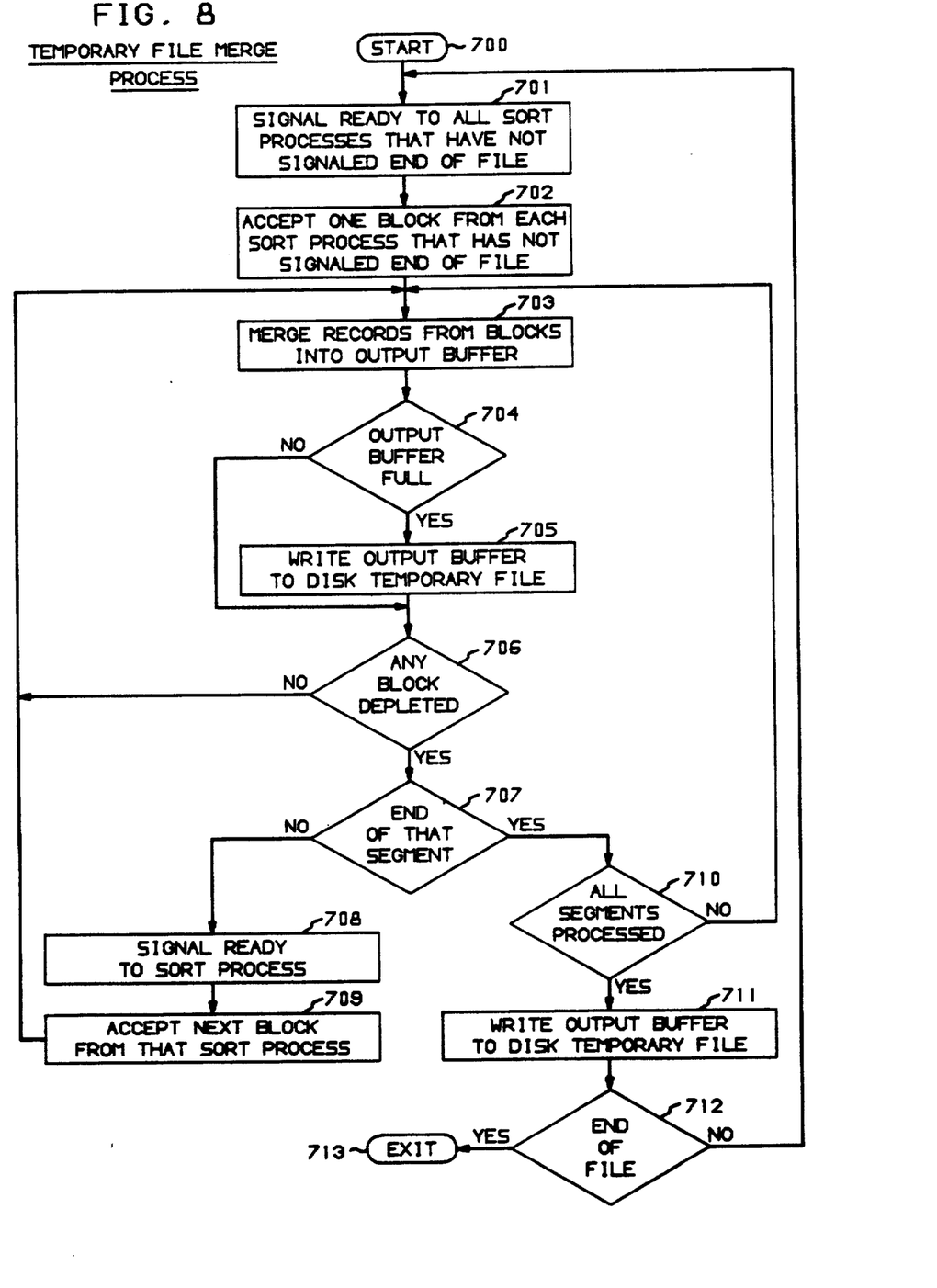
FIG. 8 is a flowchart of a temporary file merge process of the second embodiment of the invention.

A temporary file merge process, executed by each temporary file processor, is flowcharted in FIG. 8. Considering a representative temporary file processor 25, it enters the process at block 700 and sends, at block 701, a signal indicating that it is ready to receive input to sort processes of all sort processors 21-23 for which it will be merging received segments 201 and from which it has not received an "end of file" signal. As the process of FIG. 8 is just commencing, at this time it will not have received an end of file signal from sort processes of any sort processors 21-23 (see block 608 of FIG. 7).

Following receipt by processor 25 at block 702 of a sorted block 202 from sort process of each sort processor 21-23 to which it has sent a ready signal, CPU 52 of processor 25 merges records 203 from received blocks 202 into an output buffer 204, at block 703.

Periodically, for example each time after its CPU 52 has transferred a record 203 to its output buffer 204, processor 25 checks whether output buffer 204 is full of records 203, at block 704. If so, processor 25 writes the contents of output buffer 204 to temporary file 220 on disk 35, at block 705, using its disk controller 55 to transfer records 203 from output buffer 204 to disk 35.

If output buffer 204 is not found to be full at block 704, or after buffer 204 has been emptied at block 705, processor 25 checks at block 706 whether any block 202 stored in its buffer space 54 has been depleted of records 203.

If a block 202 has been depleted, processor 25 checks at block 707 whether it has received from the sort process that was the source of the depleted block 202 an "end of segment" signal indicating that the depleted block 202 was the last block 202 of a sorted segment 201. If not, processor 25 signals that sort process at block 708 that it is ready to receive another block 202. Processor 25 receives the other block 202 at block 709.

If at block 707 processor 25 finds that it has received an "end of segment" signal from that sort process, it checks at block 710 whether all segments currently being merged by its CPU 52 have been processed, i.e., if it has received the "end of segment" signal from all sort processes from which it is merging segments 201 and all blocks 202 in its buffer space 54 are depleted.

Processor 25 repeats the steps of blocks 707-710 for every block 202 in its buffer space 54 that it finds depleted at block 706.

From blocks 709 and 710, processor 25 returns to block 703 to merge more records 203, unless it finds at block 710 all segments 201 that it is merging to have been processed.

If at block 710 processor 25 finds all segments 201 processed, it uses its disk controller 55 to write the contents of its output buffer 204 into temporary file 220 on disk 35, at block 711. Temporary file 220 at this time contains one large sorted segment 205 (see FIG. 3) created by processor 25 by merging a plurality of segments 201 each one from a different sort process. Processor 25 then checks whether it has received an "end of file" signal from each sort process from which it has just been merging segments 201 If not, processor 25 returns to block 701 to receive another segment 201 from each sort process from which it has not received the "end of file signal" and to merge the received segments 201 into another large segment in temporary file 220.

If processor 25 has received "end of file" signals from all sort processes of concern, its task is ended, and it exits the process of FIG. 8 at block 713.

The merge process of FIG. 9 and the output file process of FIG. 10 remain the same in this example, with the exception that the merge process is not merging segments 201 written into temporary file 220 by the processor that it is executing on, but rather is merging a group of large sorted segments 205 written into temporary file 220 by one or more temporary file processes.

Of course, it should be understood that various changes and modifications to the illustrative embodiment described above will be apparent to those skilled in the art. For example, buffer space in each processor may be "double buffered", such that a process may be receiving a new block of records from a segment before it has depleted a previously-received block from that segment, and such that a process may be filling one output buffer with records while it is empty a full another buffer, to improve parallelism. Such changes and modifications can be made without departing from the spirit and the scope of the invention and without diminishing its attendant advantages. It is therefore intended that all such changes and modifications be covered by the following claims.

What is claimed is:

1. A method of merging a plurality of sorted files stored in a secondary memory of at least one secondary memory in a multiprocessor system, comprising the steps of:

transferring from the secondary memory to each processor of a plurality of first processors a different plurality of the sorted files, each file of a plurality of the sorted files transferred to any first processor at any times as part of the merging of the plurality of the sorted files being a different file from the files of the other pluralities of the sorted files transferred to the other first processors;

merging transferred sorted files into a merged file a portion at a time wherein the merged file includes a plurality of the portions, at each of the first processors;

transferring the merged file a portion at a time from each of the first processors to a second processor;

merging the transferred portions of the merged files into an output file at the second processor in parallel with merging of the transferred sorted files at the first processors; and storing the output file in a secondary memory of the at least one secondary memory.

2. A multiprocessor apparatus for merging a plurality of sorted files, comprising:

secondary memory means for storing files including the plurality of sorted files;

a plurality of first processors, connected to the secondary memory means, each for merging files transferred thereto into a merged file a portion at a time wherein the merged file includes a plurality of the portions;

means, connected to the secondary memory means and to the first processors, for transferring from the secondary memory means to each first processor a different plurality of the sorted files, each file of a plurality of the sorted files transferring to any first processor at any times as part of the merging of the plurality of the sorted files being a different file from the files of the other pluralities of the sorted files transferred to the other first processors;

a second processor, connected to the first processors, for merging portions of the merged files transferred to the second processor from the first processors into an output file in parallel with merging of the transferred sorted files at the first processors;

means, connected to the second processor and to the first processors, for transferring the merged file a portion at a time from each of the first processors to the second processor; and means, connected to the second processor, for storing the output file in the secondary memory means.

3. A method of sorting an input file stored in a secondary memory of at least one secondary memory in a multiprocessor system, comprising the steps of:

transferring from the secondary memory to each processor of a plurality of first processors a different at least one portion of the input file, each portion of the input file transferred to any first processor at any times as part of sorting of the input file portions being a different portion from the portion of the input file transferred to the other first processors;

sorting transferred portions at each first processor;

storing each sorted portion in a secondary memory of the at least one secondary memory;

transferring from the secondary memory that is storing the sorted portions to each processor of a plurality of second processors a different plurality of sorted portions;

merging transferred portions into a merged portion at each processor of the plurality of second processors;

transferring the merged portions from the second processors to a third processor;

merging transferred merged portions into an output file at the third processor; and storing the output file in a secondary memory of the at least one secondary memory.

4. The method of claim 3 wherein
the step of storing each sorted portion comprises the steps of:

transferring each sorted portion from a plurality of the first processors to a fourth processor;

merging at the fourth processor into a large sorted portion a plurality of sorted portions each transferred from a different first processor; and storing each large sorted portion in the secondary memory for storing sorted portions; and wherein
the step of transferring a different plurality of sorted portions comprises the step of:

transferring from the secondary memory for storing sorted portions to each second processor a different plurality of large sorted portions.

5. A multiprocessor apparatus for sorting an input file, comprising:
   secondary memory means for storing files including the input file;
   a plurality of first processors, connected to the secondary memory means, each for storing each input file portion transferred to the first processor from the secondary memory means;
   means, connected to the secondary memory means and to the first processors, for transferring from the secondary memory means to each first processor a different at least one portion of the input file, each portion of the input file transferred to any first processor at any times as part of the sorting of the input file portions being a different file portion from the portion of the input file transferred to the other first processors;
   means, connected to the secondary memory means and to the first processors, for storing each sorted portion in the secondary memory means;
   a plurality of second processors, connected to the secondary memory means, each for merging sorted portions transferred to the second processor from the secondary memory means into a merged portion;
   means, connected to the secondary memory means and to the second processors, for transferring from the secondary memory means to each second processor a different plurality of sorted portions;
   a third processor, connected to the second processors, for merging merged portions transferred to the third processor from the second processors into an output file;
   means, connected to the third processor and to the second processors, for transferring the merged portions from the second processors to the third processor; and
   means, connected to the third processor and to the secondary memory means, for storing the output file in the secondary memory means.

6. The apparatus of claim 5 wherein
   the means for storing each sorted portion comprise:
   a fourth processor of the multiprocessor apparatus connected to the first processors, for merging into a large sorted portion a plurality of sorted portions each received from a different first processor;
   means, connected to the fourth processor and to the first processors, for transferring each sorted portion from a plurality of the first processors to the fourth processor; and
   means, connected to the fourth processor and to the secondary memory means, for storing each large sorted portion in the secondary memory means; and wherein
   the means for transferring a different plurality of sorted portions comprise:
   means, connected to the secondary memory means and to the second processors, for transferring from the secondary memory means to each second processor a different plurality of large sorted portions.

7. A method of merging a plurality of sorted files stored on a disk memory of at least one disk memory in a multiprocessor system, each file including a sequence of a plurality of contiguous blocks of different sorted records, the method comprising the steps of:
   transferring from the disk memory to each processor of a plurality of first processors a different plurality of the sorted files by transferring the blocks of each sorted file sequentially a block at a time, each file of a plurality of the sorted files transferred to any first processor at any times as part of the merging of the plurality of the sorted files being a different file from the files of the other pluralities of the sorted files transferred to the other first processors;
   merging at each first processor of the plurality of processors the records of blocks transferred to the first processor from the disk memory into blocks of merged records, by merging at any time a block of each file of the first processor's own plurality of the sorted files;
   transferring the blocks of the merged records a block at a time from each of the first processors to a second processor;
   merging at the second processor the blocks of the merged records transferred thereto from the first processors in parallel with merging of records into as-yet untransferred blocks of the merged records at the first processors; and
   storing the records merged at the second processor in an output file on a disk memory of the at least one disk memory.

8. The method of claim 7 wherein
   the step of transferring the merged records comprises the step of transferring the blocks of the merged records a block at a time from every first processor to the second processor, and wherein
   the step of merging at the second processor comprises the step of
   merging at the second processor the transferred blocks of the merged records a block at a time from every first processor.

9. A multiprocessor apparatus for merging a plurality of sorted files, comprising
   disk memory means for storing files including the plurality of sorted files;
   a plurality of first processors, connected to the disk memory means, each for merging records of blocks which are transferred to the first processor from the disk memory means into blocks of merged records, by merging at any time a block of each file of a plurality of files;
   means, connected to the disk memory means and to the first processors, for transferring from the disk memory means to each first processor a different plurality of the sorted files by transferring the blocks of each sorted file sequentially a block at a time, each file of a plurality of the sorted files transferred to any first processor at any times as part of the merging of the plurality of the sorted files being a different file from the files of the other pluralities of the sorted files transferred to the other first processors;
   a second processor, connected to the first processors, for merging blocks of the merged records transferred thereto from the first processors in parallel with merging of records into as-yet transferred blocks of the merged records at the first processors;
   means connected to the first processors and to the second processor, for transferring the blocks of the merged records a block at a time from each of the first processors to the second processors; and
   means, connected to the second processor and to the disk memory means, for storing the records merged at the second processor in an output file on the disk memory means.

10. The apparatus of claim 9 wherein the means for transferring the blocks of the merged records comprise means, connected to the first processors, for transferring the blocks of the merged records a block at a time from every first processor to the second processor; and wherein the second processor comprises a processor, connected to the means for transferring the blocks of the merged records, for merging the transferred blocks of the merged records a block at a time from every first processor.

11. A method of sorting an input file stored on a disk memory of at least one disk memory in a multiprocessor system, the input file having a plurality of segments each having a plurality of different records, the method comprising the steps of:

transferring from the input file a different at least one segment a segment at a time to each processor of a plurality of first processors, each segment of the input file transferred to any first processor at any times as part of sorting of the input file segments being a different segment from the segments of the input file transferred to the other first processors;

sorting at each first processor the records of each segment transferred to the first processor from the input file a segment at a time, to obtain sorted segments each having a sequence of a plurality of contiguous blocks of different sorted records;

storing each sorted segment in a temporary file on a disk memory of the at least one disk memory;

transferring from the temporary file to each processor of a plurality of second processors a different plurality of the sorted segments, the transfer to each second processor occurring sequentially a block of any one segment at a time;

merging at each second processor the records of blocks transferred to the second processor from the temporary file a block of each segment at a time;

transferring the merged records from the second processors to a third processor;

merging at the third processor the records transferred thereto from the second processors; and storing the records merged at the third processor in an output file on a disk memory of the at least one disk memory.

12. The method of claim 11 wherein the step of storing in a temporary file comprises the steps of:

transferring a plurality of sorted segments from a plurality of the first processors to a fourth processor;

merging at the fourth processor into a large sorted segment the records of a plurality of the sorted segments each transferred thereto from a different first processor; and storing each large sorted segment in a temporary file on a disk memory.

13. The method of claim 11 in a multiprocessor system wherein the plurality of first processors comprises a plurality of non-overlapping sets of first processors, wherein the step of storing in a temporary file comprises the steps of:

transferring from the first processors of each set to a different fourth processor the sorted segments sequentially a block at a time of one segment from each first processor of the set;

merging at each fourth processor into a large sorted segment the records of blocks of a plurality of sorted segments one transferred thereto from each first processor of the set, sequentially one block of each sorted segment at a time, to obtain at each fourth processor at least one large sorted segment; and storing each large sorted segment in a temporary file on a disk memory of the at least one disk memory.

14. The method of claim 11 wherein the step of transferring the merged records comprises the step of transferring the merged records a block at a time from each second processor to the third processor; and wherein the step of merging at the third processor comprises the step of merging at the third processor the merged records transferred to the third processor from each second processor a block from each second processor at a time.

15. A multiprocessor apparatus for storing an input file, comprising:

disk memory means for storing files including the file having a plurality of segments each having a plurality of different records;

a plurality of first processors, connected to the disk memory means, each for sorting a segment at a time the records of each segment transferred to the first processor from the disk memory means, to obtain sorted segments each having a sequence of a plurality of contiguous blocks of different sorted records;

means, connected to the disk memory means and to the first processors, for transferring from the input file a different at least one segment a segment at a time to each first processor, each segment of the input file transferred to any first processor at any times as part of the sorting of the input file segments being a different segment from the segments of the file transferred to the other first processors;

means, connected to the disk memory means and to the first processors, for storing each sorted segment in a temporary file on the disk memory means;

a plurality of second processors, connected to the disk memory means, each for merging the records of blocks transferred to the second processor from the temporary file, a block of each segment of a plurality of segments transferred to each second processor from the temporary file at a time;

means, connected to the disk memory means and to the second processors, for transferring from the temporary file to each second processor a different plurality of the sorted segments sequentially a block of any one segment at a time;

a merging processor, connected to the second processors, for merging records transferred thereto from the second processors;

means, connected to the merging processor and to the second processors, for transferring the merged records from the second processors to the merging processors, and means, connected to the merging processor and to the disk memory means, for storing the records merged at the merging processor in an output file on the disk memory means.

16. The apparatus of claim 15 wherein the means for storing in a temporary file comprise:

a third processor, connected to the first processors, for merging into a large sorted segment the records of a plurality of sorted segments each transferred thereto from a different first processor;

means, connected to the third processor and to the first processors, for transferring a plurality of sorted segments from a plurality of the first processors to the third processor; and means, connected to the third processor and to the disk memory means, for storing each large sorted segment in the temporary file on the disk memory means.

17. The apparatus of claim 15 wherein the plurality of first processors comprises a plurality of non-overlapping sets of first processors, and wherein the means for storing in a temporary file comprise:

a plurality of third processors, connected to the first processors, each for merging into a large sorted segment the records of blocks of a plurality of sorted segments each transferred to the third processor from a different first processor sequentially one block of each sorted segment at a time, to obtain at each third processor at least one large sorted segment;

means, connected to the third processors and to the first processors, for transferring from the first processors of each set to a different third processor the sorted segments sequentially a block at a time of one segment from each first processor of the set; and means, connected to the third processors and to the disk memory means, for storing each large sorted segment in the temporary file on the disk memory means.

18. The apparatus of claim 15 wherein the means for transferring the merged records comprise means, connected to the merging processor and to the second processors, for transferring the merged records a block at a time from each second processor to the merging processor, and wherein the merging processor comprises a processor, connected to the means for transferring the merged records, for merging records transferred to the merging processor from the second processors a block from each second processor at a time.

* * * * *

UNITED STATES PATENT AND TRADEMARK OFFICE
CERTIFICATE OF CORRECTION

PATENT NO.   : 5,084,815
DATED        : January 28, 1992
INVENTOR(S)  : Andrea M. Mazzario It is certified that error appears in the above-indentified patent and that said Letters Patent is hereby corrected as shown below:

<u>In the Claims:</u>

Column 12, line 10, "transferring" should read --transferred--.

Column 13, line 6, "storing" should read --sorting--.

Column 14, line 26, after "of", insert a paragraph indentation,
           line 58, "transferred" should read --untransferred--.

Column 16, line 14, after "of", insert a paragraph indentation,
           line 18, "storing" should read --sorting--,
           line 20, after "the", insert --input--,
           line 37, after "the," (1st occurrence) insert --input--,
           line 58, "processors" should read --processor--.

Column 18, line 15, delete the comma and insert a semicolon.

Signed and Sealed this

Eighth Day of June, 1993

Attest:

MICHAEL K. KIRK

Attesting Officer

Acting Commissioner of Patents and Trademarks